United States Patent
Hirama et al.

(10) Patent No.: US 10,025,777 B2
(45) Date of Patent: Jul. 17, 2018

(54) USER INTERFACE SCREEN CREATION SUPPORTING SYSTEM

(71) Applicant: TOSHIBA TEC KABUSHIKI KAISHA, Shinagawa-ku, Tokyo (JP)

(72) Inventors: Mika Hirama, Tokyo (JP); Akihiko Fujiwara, Kanagawa (JP); Hiroyo Tanaka, Tokyo (JP); Shigeo Uchida, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 188 days.

(21) Appl. No.: 14/694,050

(22) Filed: Apr. 23, 2015

(65) Prior Publication Data

US 2015/0347394 A1    Dec. 3, 2015

(30) Foreign Application Priority Data

Jun. 3, 2014    (JP) ................................. 2014-115112

(51) Int. Cl.
*G06F 3/00*     (2006.01)
*G06F 17/28*    (2006.01)
(Continued)

(52) U.S. Cl.
CPC ............ *G06F 17/28* (2013.01); *G06F 3/0484* (2013.01); *G06F 8/38* (2013.01); *G06F 9/4448* (2013.01);
(Continued)

(58) Field of Classification Search
CPC combination set(s) only.
See application file for complete search history.

(56) References Cited

U.S. PATENT DOCUMENTS

2002/0073077 A1\* 6/2002 Lennon ................. G06Q 30/02
2005/0039206 A1\* 2/2005 Opdycke ............... G06Q 30/02
                                                                725/35
(Continued)

FOREIGN PATENT DOCUMENTS

JP    2006-099722    4/2006
JP    2012-018457    1/2012
(Continued)

OTHER PUBLICATIONS

Japanese Office Action for Japanese Patent Application No. 2014-115112 dated May 30, 2017.

*Primary Examiner* — Hien L Duong
(74) *Attorney, Agent, or Firm* — Amin, Turocy & Watson LLP (57) ABSTRACT

According to one embodiment, a user interface screen creation supporting system presents, to a screen creator, a design template for supporting creation of a user interface screen operated by an unspecified large number of guests. The user interface screen creation supporting system includes a guest-information acquiring unit, a template selecting unit, and a template presenting unit. The guest-information acquiring unit acquires guest information concerning the guests who operate the user interface screen. The template selecting unit selects, on the basis of the acquired guest information, out of a plurality of template groups stored in a predetermined storage region in advance, design templates that should be presented as selection candidates. The template presenting unit presents the design templates selected by the template selecting unit to the screen creator.

3 Claims, 12 Drawing Sheets

(51) Int. Cl.
*H04L 29/06* (2006.01)
*G06F 17/24* (2006.01)
*G06F 3/0484* (2013.01)
*G06F 9/451* (2018.01)
*G06F 8/38* (2018.01)
*G06F 9/44* (2018.01)
*G06Q 30/00* (2012.01)

(52) U.S. Cl.
CPC ............ *G06F 9/454* (2018.02); *G06F 17/248* (2013.01); *G06Q 30/00* (2013.01); *H04L 65/403* (2013.01)

(56) References Cited

U.S. PATENT DOCUMENTS

| | | | | |
|---|---|---|---|---|
| 2009/0144157 | A1* | 6/2009 | Saracino | G06Q 30/0277 705/14.73 |
| 2012/0179968 | A1* | 7/2012 | Madnick | G06Q 30/02 715/719 |
| 2012/0246010 | A1* | 9/2012 | Foth | G06Q 30/02 705/14.66 |
| 2012/0324342 | A1* | 12/2012 | Donley | G06F 17/248 715/246 |
| 2013/0179201 | A1* | 7/2013 | Fuerstenberg | G06Q 30/0255 705/5 |
| 2014/0012944 | A1* | 1/2014 | Kubota | H04L 67/02 709/217 |
| 2014/0067519 | A1 | 3/2014 | Shimizu | |
| 2014/0114771 | A1* | 4/2014 | Kim | G06Q 30/0269 705/14.66 |
| 2014/0164131 | A1* | 6/2014 | Kim | G06Q 30/0267 705/14.61 |
| 2014/0288946 | A1* | 9/2014 | Shinohara | G06Q 30/0241 705/2 |
| 2015/0121245 | A1* | 4/2015 | Huang | G06Q 30/0241 715/745 |
| 2015/0169535 | A1* | 6/2015 | Pusateri | G06F 17/248 715/202 |

FOREIGN PATENT DOCUMENTS

| | | |
|---|---|---|
| JP | 2013-115545 | 6/2013 |
| JP | 2013-125047 | 6/2013 |
| JP | 2014-052399 | 3/2014 |

* cited by examiner

| Sex | Age | Template ID |
|---|---|---|
| Male | 0 – 5 | 1234 |
| | 6 – 10 | 1367 |
| | 11 – 20 | 1180 |
| | 21 – | 1852 |
| Female | 0 – 5 | 2276 |
| | 6 – 10 | 2931 |
| | 11 – 20 | 2054 |
| | 21 – | 2689 |

USER INTERFACE SCREEN CREATION SUPPORTING SYSTEM

CROSS-REFERENCE TO RELATED APPLICATION

This application is based upon and claims the benefit of priority from Japanese Patent Application No. 2014-115112, filed Jun. 3, 2014, the entire contents of which are incorporated herein by reference.

FIELD

Embodiments described herein relate generally to a technique for supporting creation of a user interface screen operated by an unspecified large number of guests.

BACKGROUND

In stores, event sites, and the like, various kinds of information concerning commodities, held events, and the like are displayed using signage apparatuses (electronic signboards) and the like.

JP-A-2013-186573, JP-A-2013-115545, and JP-A-2012-18457 are examples of the related art.

However, it is not always possible to effectively attract, simply by displaying a representative image on a signage apparatus, attention of an unspecified large number of guests viewing the signage apparatus.

DETAILED DESCRIPTION

An embodiment has an object of providing, in creating a user interface screen operated by an unspecified large number of guests, a technique for supporting creation of a user interface screen that can easily attract attention of the guests.

In general, according to one embodiment, there is provided a user interface screen creation supporting system that presents, to a screen creator, a design template for supporting creation of a user interface screen operated by an unspecified large number of guests. The user interface screen creation supporting system includes a guest-information acquiring unit, a template selecting unit, and a template presenting unit. The guest-information acquiring unit acquires guest information concerning the guests who operate the user interface screen. The template selecting unit selects, on the basis of the acquired guest information, out of a plurality of template groups stored in a predetermined storage region in advance, design templates that should be presented as selection candidates. The template presenting unit presents the design templates selected by the template selecting unit to the screen creator.

Embodiments are explained below with reference to the drawings.

Figure 1:
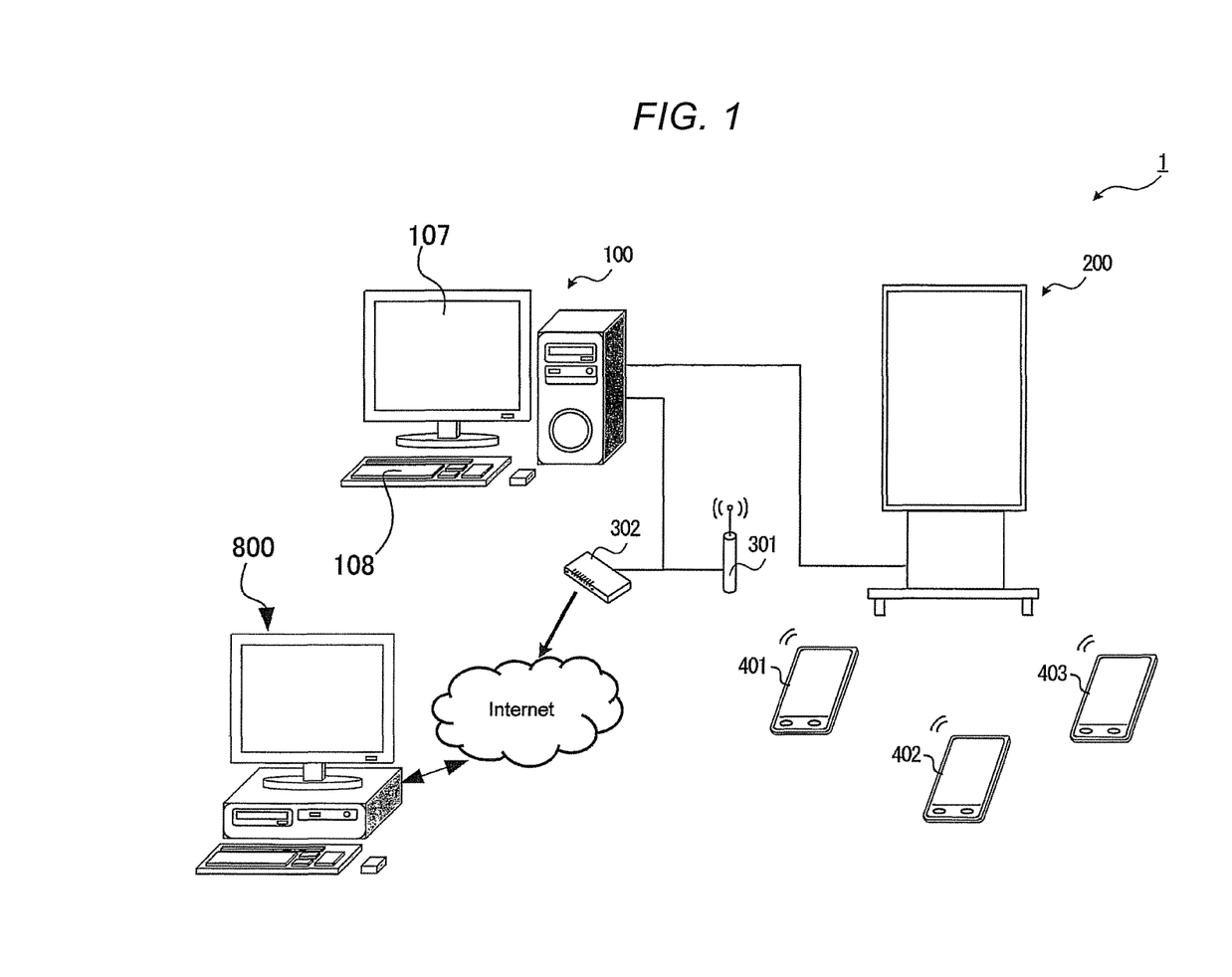
FIG. 1 is a diagram showing a configuration example of a system in an embodiment.

FIG. 1 is a diagram showing a configuration example of a system in an embodiment. An information providing system 1 includes, for example, a server 100, a signage apparatus 200, an access point 301, a router 302, and a client terminal 800. The server 100 and the signage apparatus 200 are connected by a video input and output cable such as an HDMI (High Definition Multimedia Interface) cable or a DVI (Digital Visual Interface) cable. The server 100 is connected to the access point 301 and the router 302 by, for example, a LAN (Local Area Network) cable. Note that the server 100 and the signage apparatus 200 may be connected using a LAN cable.

The server 100 is a computer that performs display control of the signage apparatus 200 and provides, via the access point 301, information to portable terminal apparatuses 401 to 403 carried by store visitors, event participants, and pedestrians. The server 100 acquires image data transmitted from the portable terminal apparatuses 401 to 403 via the access point 301 and causes the signage apparatus 200 to display the image data. The server 100 uploads the image data to a site of an SNS (Social Networking Service) via the router 302. Note that communication between the server 100 and the portable terminal apparatuses 401 to 403 may be performed using a broad area line network not via the access point 301. The server 100 can receive an operation input to an operation device 108 by an administrator and create and edit a user interface screen that the server 100 causes the signage apparatus 200 to display.

The signage apparatus 200 can be set in, for example, a commercial facility. The signage apparatus 200 is an electronic sign board disposed in a position viewable by not only store visitors and event participants but also pedestrians and the like. The signage apparatus 200 displays an image according to a video signal output from the server 100. A specific display example is explained below. The signage apparatus 200 may emit sound according to a sound signal output from the server 100.

The access point 301 is a communication infrastructure apparatus for the server 100 and the portable terminal apparatuses 401 to 403 to perform radio communication. In this embodiment, the access point 301 performs communication conforming to the standard of IEEE802.11 and performs encrypted communication. The router 302 is a device that relays communication between the information providing system 1 and an external device. The server 100 is capable of uploading an image to the SNS site via the router 302.

Note that the portable terminal apparatuses 401 to 403 are, for example, communication terminal apparatuses such as smart phones carried by store visitors, event participants, and passengers (hereinafter referred to as users). However, the portable terminal apparatuses 401 to 403 are not always limited to the communication terminal apparatuses and may be notebook computers or tablet computers. The portable terminal apparatuses 401 to 403 are capable of performing at least radio communication. A Web browser and a camera application for image pickup are introduced into the portable terminal apparatuses 401 to 403. The portable terminal apparatuses 401 to 403 display operation screens on touch panel displays using the Web browser, acquire operation information from the users via the touch panel displays, and transmit the operation information to the server 100. The portable terminal apparatuses 401 to 403 transmit picked-up images to the server 100 via the access point 301.

The client terminal 800 is a communication terminal such as a personal computer capable of communicating with the server 100 via, for example, the Internet, a LAN, or a WAN. A user can perform an operation input using an operation device 808 of the client terminal 800 and create and edit a user interface screen provided from the server 100 to the signage apparatus 200.

Figure 2:
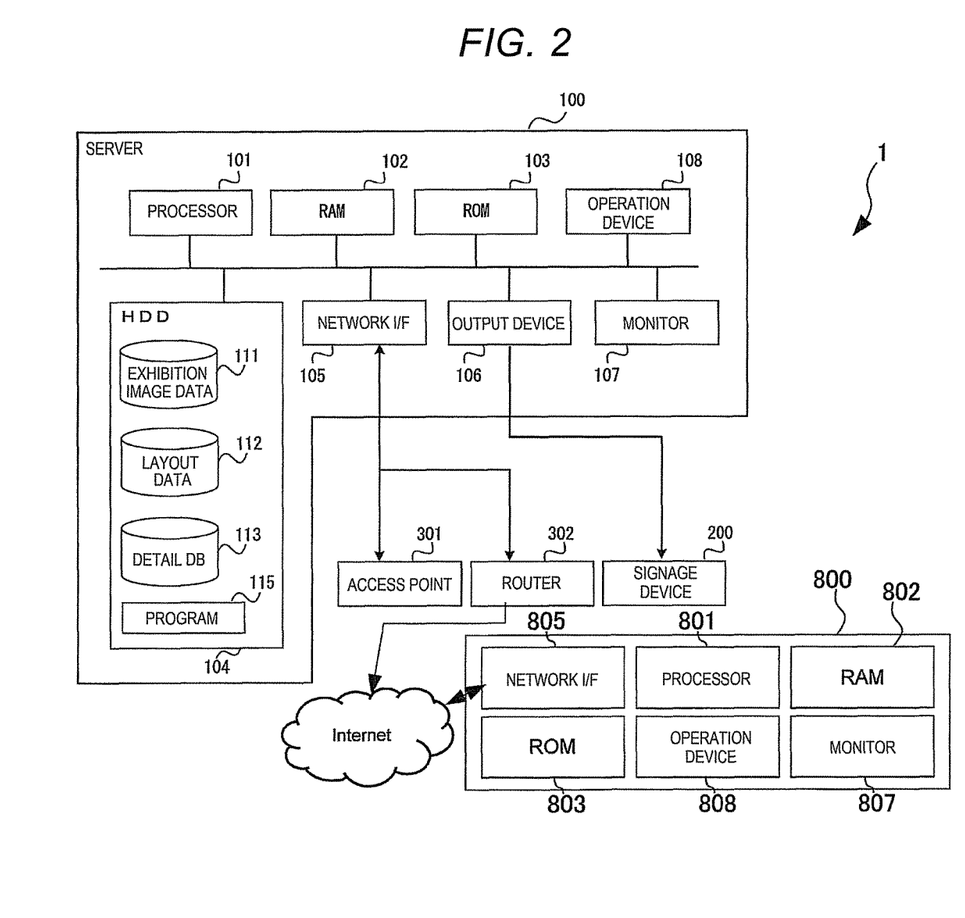
FIG. 2 is a block diagram of the system.

The configuration of the server 100 is explained with reference to FIG. 2. The server 100 includes a processor 101, a RAM (Random Access Memory) 102, a ROM (Read Only Memory) 103, a HDD (Hard Disk Drive) 104, a network I/F (Interface) 105, an output device 106, a monitor 107, and an operation device 108. The processor 101 is an arithmetic unit such as a CPU (Central Processing Unit). The processor 101 expands, in the RAM 102, a computer program stored in the ROM 103 and a computer program 115 stored in the HDD 104 and executes an arithmetic operation to provide various functions while cooperating with the respective kinds of hardware. The RAM 102 is a main storage device. The ROM 103 is a device having stored therein a system program and the like in a nonvolatile manner. The HDD 104 is an auxiliary storage device that stores computer programs, data, and the like in a nonvolatile manner. The network I/F 105 is a LAN board and performs communication between the access point 301 and the router 302. The output device 106 is a device including an HDMI terminal, a DVI terminal, and a controller that controls video output. The output device 106 is connected to the signage apparatus 200 via a cable. The monitor 107 and the operation device 108 (e.g., a keyboard) is an operation display unit used by, for example, the administrator of the server 100 when performing maintenance.

In the HDD 104, exhibition image data 111, layout data 112, a detail DB 113, and the computer program 115 are stored in advance.

The computer program 115 provides a Web server function and includes a program group executed according to an instruction from clients (in this example, the portable terminal apparatuses 401 to 403).

The exhibition image data 111 is a data group of compiled representative images of commodities and held events displayed on the signage apparatus 200. The layout data 112 is a data group that defines arrangement positions, directions, sizes, and the like in displaying characters, images, and the like on the signage apparatus 200. The layout data 112 includes, for example, a markup language, a style sheet, and a script to be executed in the server 100 and the signage apparatus 200. The detail DB 113 is a database having stored therein detailed data associated with the respective representative images of the exhibition image data 111. For example, in the case of a store dealing in clothes, in the detail DB 113, various kinds of information such as file names of the representative images, product names and prices of clothes indicated by the representative images, presence or absence of stocks for respective colors, coordinate examples (combination examples of clothes recommended by the store), and a remarks column are stored as one record. Note that, in the remarks column, text information such as information indicating whether a commodity is a discount target commodity is stored. The various kinds of information in the record are detailed information transmitted to the portable terminal apparatuses 401 to 403 of the user.

The configuration of the client terminal 800 is explained with reference to FIG. 2. The client terminal 800 includes, for example, a processor 801, a RAM (Random Access Memory) 802, a ROM (Read Only Memory) 803, a network I/F (Interface) 805, a monitor 807, and the operation device 808. The processor 801 is an arithmetic unit such as a CPU (Central Processing Unit). The processor 801 expands, in the RAM 802, a computer program stored in the ROM 803 and a computer program stored in a storage device such as a not-shown HDD and executes an arithmetic operation to provide various functions while cooperating with the respective kinds of hardware. The RAM 802 is a main storage device. The ROM 803 is a device having stored therein a system program and the like in a nonvolatile manner. The not-shown HDD is a storage device usually included in a communication terminal and is an auxiliary storage device that stores computer programs, data, and the like in a nonvolatile manner. The network I/F 805 performs communication with, for example, the router 302 via a communication line such as the Internet. The monitor 807 and the operation device 808 (e.g., a keyboard) are operation display units used by, for example, a user of the client terminal 800 in performing maintenance such as creation and editing of a user interface screen provided by the server 100.

Figure 3:
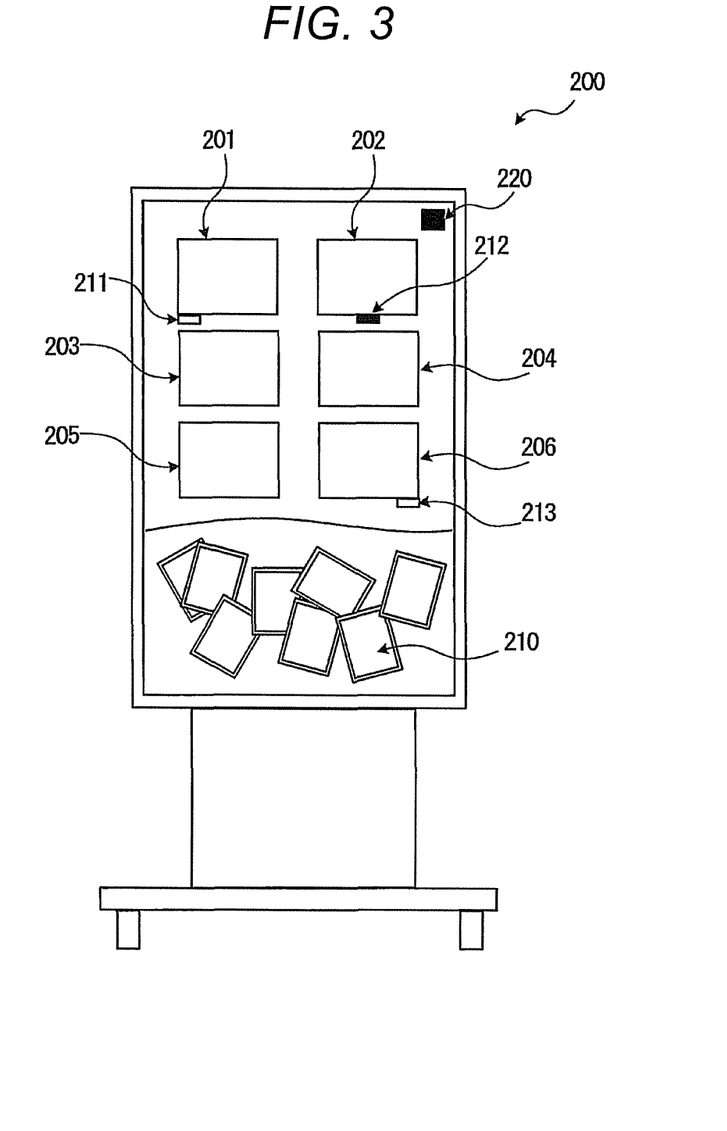
FIG. 3 is a diagram showing a display example of a signage apparatus in the embodiment.

A display example of the user interface screen in the signage apparatus 200 is shown in FIG. 3. Note that, in the following explanation, a store dealing in clothes is explained as an example. The signage apparatus 200 displays representative images 201 to 206 in an upper part of a display. The representative images 201 to 206 are snap photograph images of people who wear commodity clothes and are arrayed in the longitudinal and lateral directions and displayed as a list. The representative images 201 to 206 are data in the exhibition image data 111 stored in the HDD 104. The server 100 acquires representative images designated in advance out of the exhibition image data 111 and displays the representative images 201 to 206 on the signage apparatus 200 according to the layout data 112. The signage apparatus 200 arranges and displays photograph images 210 transmitted by users in a lower part of the display at random. In this way, the representative images 201 to 206 and the photograph images 210 are simultaneously displayed.

Cursors 211 to 213 shown in FIG. 3 are pointers that move according to operation of the users. The operation of the cursors 211 to 213 is explained. It is assumed that a user operates the cursors 211 to 213 using the portable terminal apparatus 401. The user visually recognizes display content of the signage apparatus 200, picks up an image of a QR code 220 using the portable terminal apparatus 401 to acquire a URL of the server 100, and accesses the server 100 using the Web browser. The server 100 is triggered by the access from the portable terminal apparatus 401 and transmits the data (including the script) in the layout data 112 to the portable terminal apparatus 401. The portable terminal apparatus 401 executes the transmitted script in the Web browser to display an operation screen shown in FIG. 4. The user operates a displayed cross key 411 using a touch panel display 413. Information concerning the operation is sequentially transmitted to the server 100. The server 100 moves the cursor 211 according to the operation information.

Figure 4:
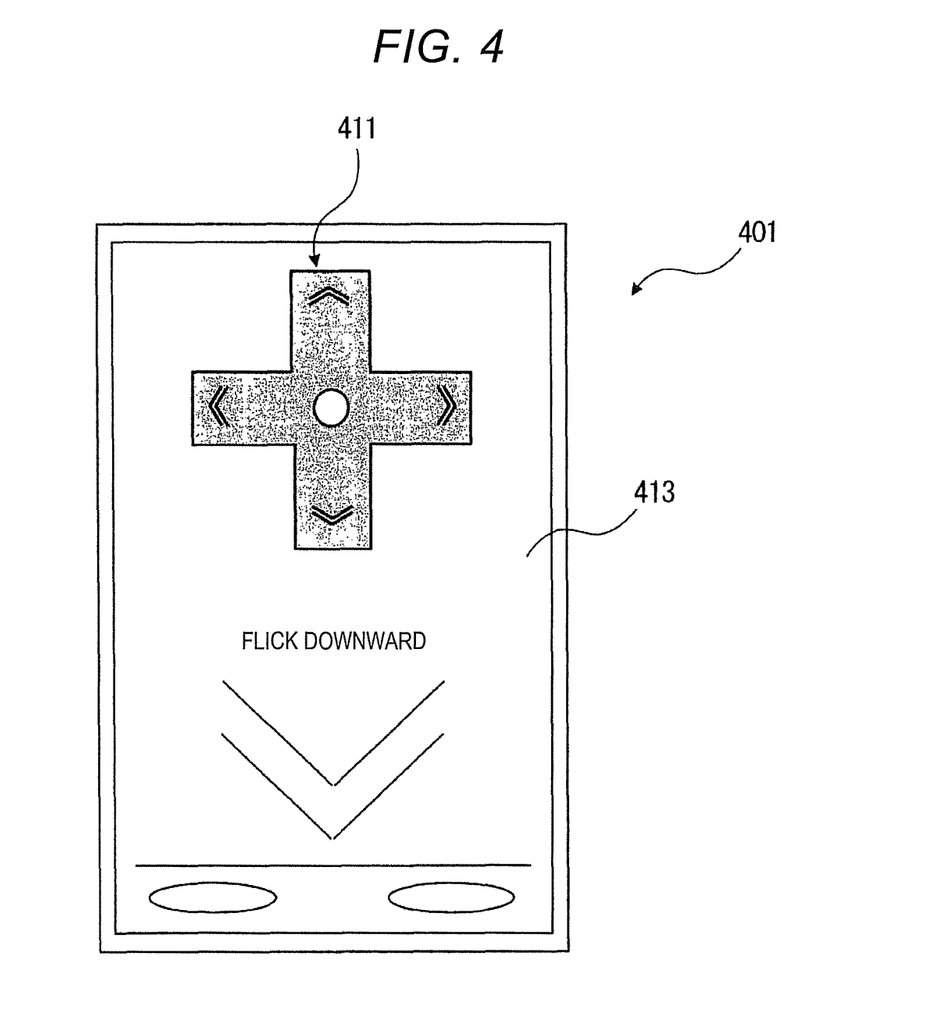
FIG. 4 is a diagram showing a display example of a cursor operation screen of a portable terminal apparatus in the embodiment.

The server 100 allows simultaneous operation from a plurality of terminals. That is, the operation explained above can be simultaneously performed using the portable terminal apparatuses 402 and 403. When a plurality of users operate the cursors 211 to 213, it is unknown which cursors the users are operating. Therefore, in this embodiment, the cursors shown in FIG. 3 and the cross key 411 shown in FIG. 4 are colored in the same color. In this example, the cursor 211 is operated using the portable terminal apparatus 401. The cursors 212 and 213 are respectively operated using the other portable terminal apparatuses 402 and 403. In this example, the display color of the cross key 411 and the color of the cursors are the same. However, not only this, but the portable terminal apparatuses only have to display colors same as the colors of the cursors to a degree that the user can understand.

Operation and screen display examples in the portable terminal apparatus 401 are explained. When the user places the cursor on an interesting representative image and flicks in a downward direction on the operation screen shown in FIG. 4, the server 100 receives information concerning this operation and acquires, from the detail DB 113, detailed data associated with the selected representative image. The server 100 transmits the acquired detailed data and the representative image to the portable terminal apparatus 401. The server 100 acquires predetermined data from the layout data 112 and transmits the predetermined data.

Figure 5:
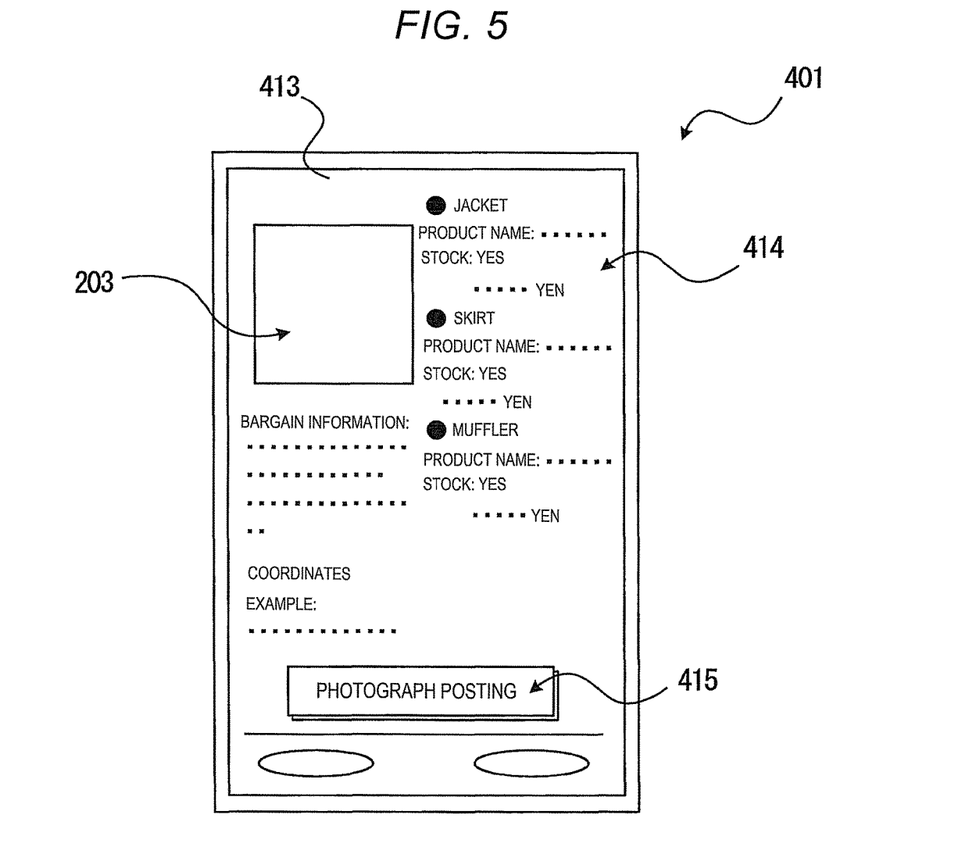
FIG. 5 is a diagram showing a display example after representative image selection of the portable terminal apparatus.

The portable terminal apparatus 401 displays, according to the transmitted layout data, the representative image (it is assumed that the representative image 203 shown in FIG. 3 is selected) and detailed data 414 as shown in FIG. 5. For example, if the representative image 203 is an image of a person wearing a jacket, a skirt, a muffler, and the like, the detailed data 414 are values registered in the detail DB 113 such as product names, presence or absence of stocks, prices, and the like of the jacket, the skirt, the muffler, and the like. A coordinate example in the same record is also displayed. The remarks column is displayed as bargain information.

After trying on the clothes with reference to the representative image 302, the coordinate example, and the like, the user presses a button 415 shown in FIG. 5. Consequently, a camera application for image pickup is started. An image of a try-on state and the like can be picked up. Data of the picked-up image is transmitted to the server 100 and displayed as the photograph image 210 in the lower part of the display of the signage apparatus 200. On the other hand, the server 100 uploads, to the SNS, the picked-up image data transmitted from the portable terminal apparatus 401. In this embodiment, an account for the information providing system 1 is registered in the SNS in advance. The server 100 uploads the picked-up image data using the registered account. The server 100 transmits a linked URL of the upload to the portable terminal apparatus 401. Consequently, the user can inform acquaintances and unspecified people of various kinds of information (tried-on clothes, a store name, etc.) using a function of an SNS application.

An operation example of the server 100 is explained with reference to FIGS. 6 and 7. The operations of the server 100 are realized by the processor 101 expanding, in the RAM 102, the computer program 115 stored in the HDD 104 in advance and executing an arithmetic operation.

Figure 6:
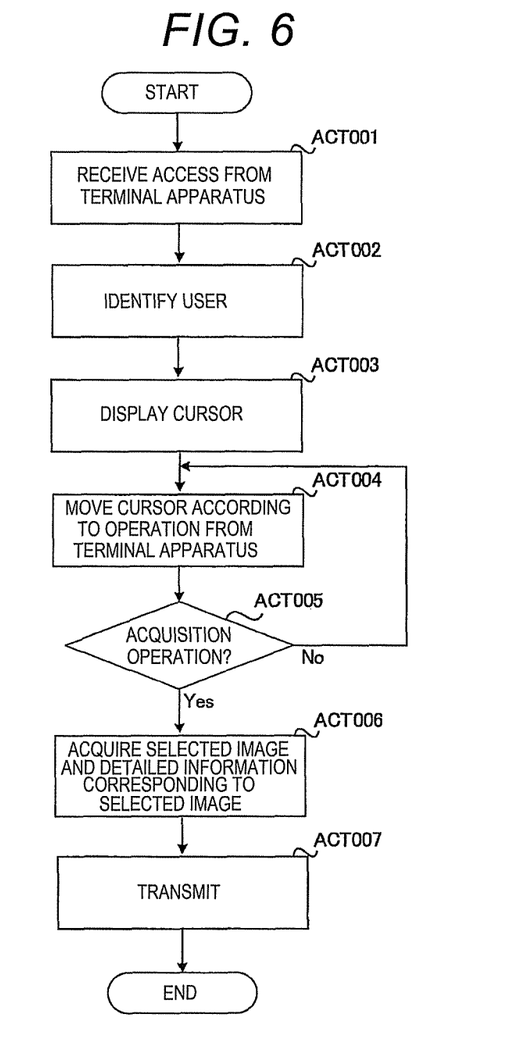
FIG. 6 is a flowchart for explaining an operation example of a server in the embodiment.

FIG. 6 is a flowchart for explaining an example of operation up to acquisition of detailed information by the user. The processor 101 receives an access from the portable terminal apparatus via the network I/F 105 (ACT 001). In this example, it is assumed that the server 100 is accessed from the portable terminal apparatus 401. The processor 101 also acquires information for identifying the user. The user identification information is stored in the portable terminal apparatus 401 using a technique such as Cookie. Note that, in the case of a new access, new user identification information is stored in the portable terminal apparatus 401.

The processor 101 specifies and identifies the user on the basis of the transmitted user identification information (ACT 002). The user identification is reflected on, for example, the color of the cursor. If a cursor color same as a cursor color used last time is not in use, the processor 101 allocates the color to be used. Note that the user identification may be performed using the Cookie as explained above or HTTP-based user authentication may be performed. A peculiar ID or the like of the terminal can be acquired and collated with registered information and access information in the past.

The processor 101 controls the signage apparatus 200 to display the cursor for the user (ACT 003). The processor 101 moves the cursor according to operation information of the portable terminal apparatus 401 received by the network I/F 105 (ACT 004). The processor 101 repeatedly executes Act 004 until the processor 101 receives information concerning acquisition operation (flick operation in the downward direction) (a loop of No in ACT 005). If the processor 101 receives the acquisition operation (Yes in ACT 005), the processor 101 acquires, from the detail DB 113, detailed information corresponding to a selected representative image, acquires the selected representative image from the exhibit image data 111 (ACT 006), and transmits the data to the portable terminal apparatus 401 (ACT 007). Note that the processor 101 specifies a record in the detail DB 113 on the basis of a file name of the representative image and acquires the detailed information.

Figure 7:
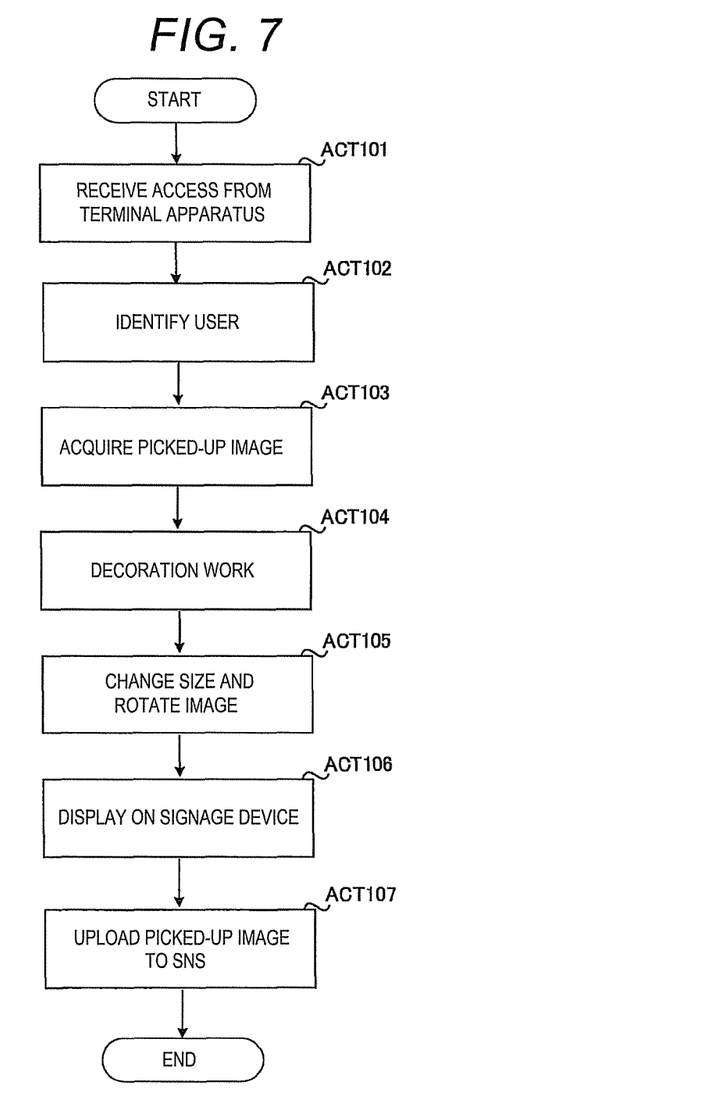
FIG. 7 is a flowchart for explaining an operation example in receiving photograph image data picked up by a user.

FIG. 7 is a flowchart for explaining an operation example in receiving photograph image data picked up by the user. The processor 101 receives an access from the portable terminal apparatus 401 (Act 101) and identifies the user on the basis of user identification information transmitted simultaneously with the access (ACT 102). When the network I/F 105 receives a picked-up image, the processor 101 temporarily stores the picked-up image in the RAM 102 (ACT 103).

The processor 101 applies decoration work to the picked-up image to, for example, set a frame or the like of a photograph (ACT 104). The processor 101 changes a large size of the picked-up image to a specified size and rotates the image (ACT 105). The image is rotated to a degree for not vertically reversing the image. The processor 101 causes the signage apparatus 200 to display an image after the processing in ACTS 104 and 105 (see a photograph image 210 in FIG. 3). The photograph image is arranged at random as shown in FIG. 3. If a photograph image is already displayed, the photograph image is allowed to be arranged over the already-displayed photograph image.

The processor 101 operates the network I/F 105 and uploads the picked-up image to the SNS site (Act 107). The picked-up image received in ACT 103 may be uploaded as it is or an image obtained by subjecting the picked-up image to various kinds of work may be uploaded.

As explained above, the user can select a desired representative image from the signage apparatus, which a plurality of people can view, and easily provide detailed information corresponding to the representative image. Since the user displays the picked-up image on the signage apparatus, it is possible to provide an information providing system of a user participation type rather than one-way information presentation.

A method of creating and editing the user interface screen screen-displayed on the signage apparatus 200 as explained above in the information providing system 1 according to this embodiment a user interface screen creation supporting method is explained.

In this embodiment, a creator of the user interface screen operated by an unspecified large number of guests is capable of executing, by operating the operation device 108 of the server 100 or the operation device 808 of the client terminal 800, creation and editing of the user interface screen screen-displayed on the signage apparatus 200.

Figure 8:
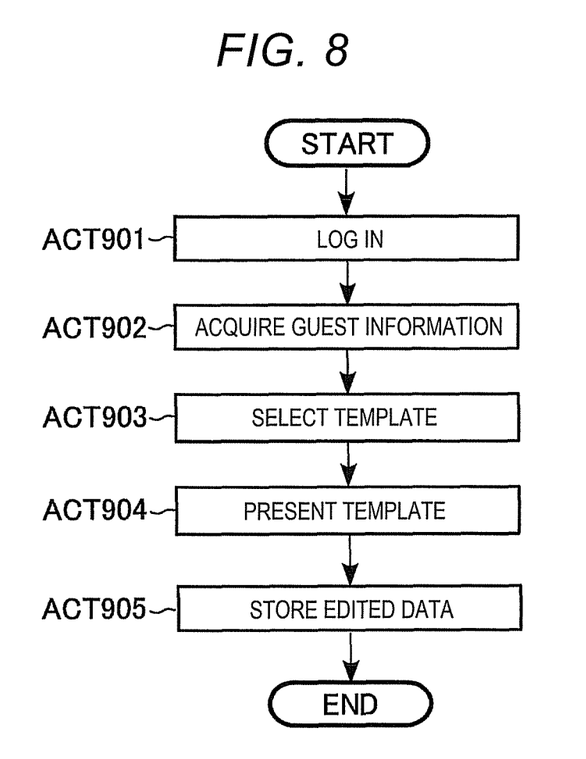
FIG. 8 is a flowchart for explaining a creation supporting method for a user interface screen in the embodiment.

FIG. 8 is a flowchart for explaining the creation supporting method for the user interface screen in this embodiment. As an example, a user who operates the operation device 808 of the client terminal 800 (e.g., an administrator of a screen of a store) logs in to the server 100 through a network and edits a user interface screen provided to the signage apparatus 200 by the server 100. Naturally, not only this, but processing is performed in the same process when the user directly operates the operation device 108 of the server 100 and edits the user interface screen provided to the signage apparatus 200 by the server 100. Therefore, a system substantively including processing functions of ACT 902 to ACT 904 explained below is equivalent to the user interface screen creation supporting system. Naturally, the functions of ACT 902 to ACT 904 do not need to be provided in a single apparatus. The functions of ACT 902 to ACT 904 only have to be resultantly realized in the entire system.

First, the processor 801 performs, on the basis of an operation input by a user to the operation device 808, authentication of log-in operation by the user (ACT 901).

Subsequently, the processor 801 (a guest-information acquiring unit) acquires guest information concerning a guest who operates the user interface screen (ACT 902).

Note that examples of the "guest information" include:
(1) appearance information such as sex, an age bracket, height, a body type, and clothes estimated by analyzing, with a face recognition technique or a pattern recognition technique, an image in which a guest who operates the signage apparatus 200 is picked up by a camera or the like included in the signage apparatus 200 or the like;
(2) information concerning preference such as tastes and hobbies estimated from, for example, histories of operation of the signage apparatus 200 by guests;
(3) information concerning sexes, ages, physical features, preference, and the like registered in advance in association with identification information of the guests; and
(4) attribute information such as sexes, age brackets, heights, body types, and clothes of guests in a target class registered in advance by the administrator of the user interface screen.

For example, if the guest information of (1) above is acquired, the processor 801 receives, through a network, data such as an image picked up by the signage apparatus 200 and sound recorded by the signage apparatus 200 and analyzes the data to thereby estimate attributes of guests present around the signage apparatus 200. Specifically, the signage apparatus 200 includes a camera and a microphone (a peripheral-guest-information acquiring unit) for acquiring "peripheral guest information" concerning users present around the user interface screen screen-displayed on the signage apparatus 200. Information acquired by the camera and the like is acquired as guest information by the processor 801 (the guest-information acquiring unit).

For example, images of a face, a body type, a hairstyle, clothes, and the like of a guest present around the user interface screen of the signage apparatus 200 and viewing the user interface screen are picked up by the camera. Face recognition and the like are performed by a publicly-known image recognition technique. Consequently, it is possible to estimate, as the peripheral guest information, sex, rough age, and the like of the guest present around the screen.

Voice of a guest speaking around the user interface screen of the signage apparatus 200 is recorded by the microphone and analyzed by a publicly-known sound recognition technique or the like. Consequently, it is possible to estimate, as the peripheral guest information, sex, rough age, and the like of the guest present around the screen.

For example, when the guest information of (2) above is acquired, the processor 801 can acquire a history of operation in the past of the signage apparatus 200 by a guest in association with attribute information of the guest who performed the operation.

For example, when the guest information of (3) above is acquired, the processor 801 can acquire, as guest information, attribute information of customers registered in advance in the server 100 or the like as customer information at the time of admission to a membership service such as a point card. If the specific membership service is registered in association with logins ID of the customers according to necessity, a user (a screen creator) who performs creation and editing of a screen can use, as the guest information, registration information in the specific membership service. For example, when a screen creator performs creation and editing of a user interface screen of a store A, if the screen creator associates a login ID of the screen creator and the store A, the screen creator can use, for screen creation support in performing creation and editing of the user interface screen, guest information registered in association with a service of the store A.

For example, when the guest information of (4) above is acquired, the processor 801 can acquire, as the guest information, attribute information such as sexes, age brackets, heights, body types, and clothes of guests in an advertisement target class registered in advance in, for example, the HDD of the server 100 by the administrator of the user interface screen.

Note that, as the guest information acquired by the processor 801, the guest information of (3) and (4) above associated with an ID of a screen creator can be acquired on the basis of login information of the screen creator obtained by the authentication processing performed in ACT 901. However, not only this, but, specifically, for example, when the screen creator desires to utilize the guest information of (1) and (2) above for creation support of an interface screen, information such as an operation history of the guest in a specific period of time in the signage apparatus 200 may be acquired as the guest information and used later.

Figure 9:
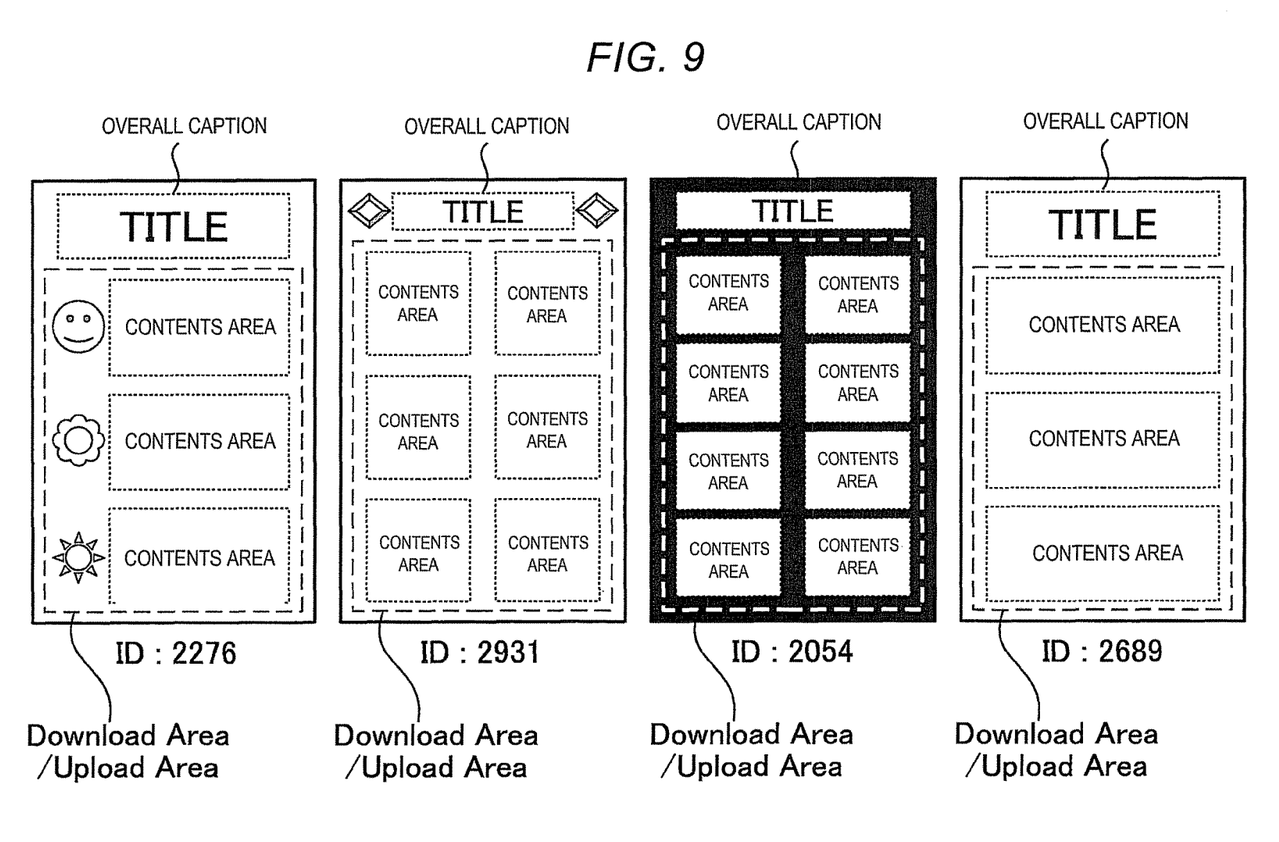
FIG. 9 is an example of a design template group stored in advance in a HDD of a server.

Subsequently, the processor 801 (a template selecting unit) selects, on the basis of the acquired guest information, out of a plurality of template groups stored in a predetermined storage region in advance, design templates that should be presented as selection candidates (ACT 903). FIG. 9 is a diagram of an example of a design template group stored in advance in the HDD 104 of the server 100. As shown in FIG. 9, design templates prepared in advance are attached with IDs. As the design templates, various design template groups are prepared assuming guests having various attributes such that great advertisement effects can be obtained according to attributes of guests set as an advertisement target. The design templates include:

ID: 2276—a design template in which characters are displayed to easily attract attention of infants and a font size is large;

ID: 2931—a design template in which a bright tone of color is used to easily attract attention of elementary school students and the number of areas where contents can be displayed is set larger than the number of areas in ID: 2276;

ID: 2054—a design template in which a subdued tone of color is used to easily attract attention of adults and the number of areas where contents can be displayed is set larger than the number of areas in ID: 2931; and ID: 2689—a design template in which the number of contents displayed on one screen is reduced and a font size is increased to realize high visibility for aged people.

The processor 801 (a corresponding-template setting unit) can also set, on the basis of an operation input to the operation device 808 by the screen creator, any template that should be displayed to the guest indicated by the peripheral guest information acquired by the camera, the microphone, or the like functioning as the peripheral-guest-information acquiring unit.

With such a configuration, a design template of a user interface screen desired to be displayed is selected according to attributes of a guest in advance. When the guest is actually present around the signage apparatus 200, the user interface screen by the design template associated with the attributes of the guest in advance is displayed. Consequently, for example, it is possible to provide information using a method suitable for an age bracket and sex of the guest.

Figure 10:
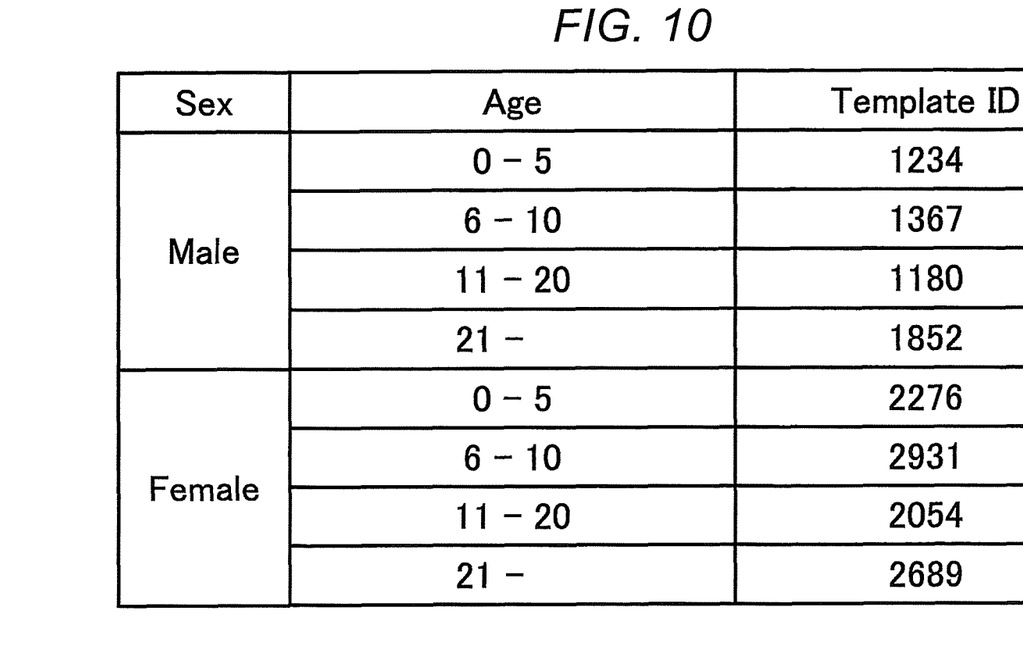
FIG. 10 is a diagram showing an example of a table that specifies selection rules in selecting a design template.

The processor 801 (the template selecting unit) extracts, on the basis of a data table shown in FIG. 10 registered in advance in the HDD 104 of the server 100, a recommended design template out of the design templates illustrated in FIG. 9. For example, if acquired guest information indicates "female" and "six to ten years old", the processor 801 selects the design template of ID: 2931 on the basis of the table shown in FIG. 10 (ACT 903).

The processor 801 (a template presenting unit) screen-displays the selected design template on the monitor 807 and presents the design template to the screen creator as a template for screen creation (ACT 904). Naturally, for convenience of explanation, one template is resultantly displayed. However, not only this, but a determination table may be used from which a plurality of design templates are resultantly presented.

The design template selected as explained above has, at a page top, a text box "TITLE" serving as a caption. A plurality of contents areas are arrayed under the text box.

Figure 11:
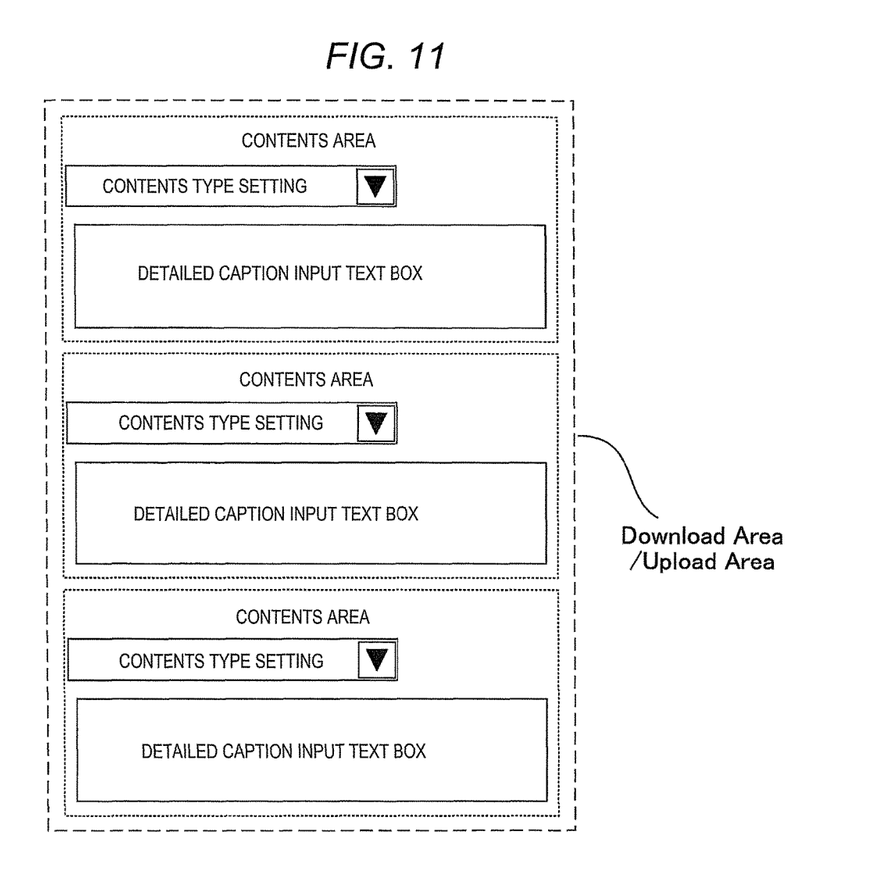
FIG. 11 is a diagram showing an example of setting items of each of contents areas in a design template of ID: 2931.

FIG. 11 is a diagram showing an example of setting items of each of the contents areas in the design template of ID: 2931.

Figure 12:
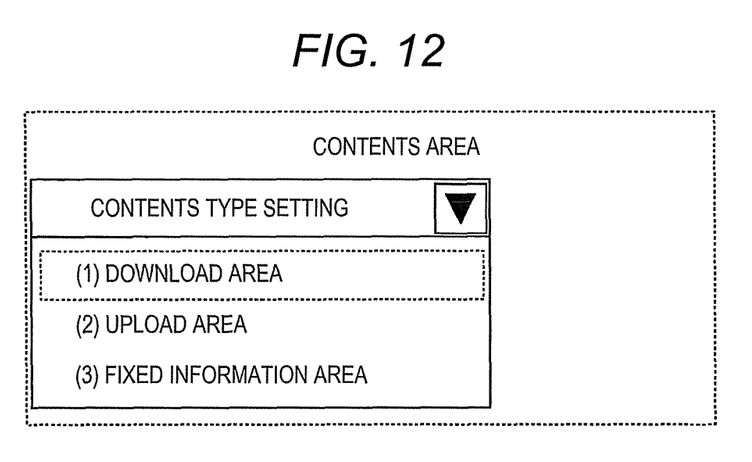
FIG. 12 is a diagram showing an example of setting items of contents areas in the design template of ID: 2931.

As shown in the figure, the contents area can be set to selectively display any one of a "download area" that is an area where a downloadable image is displayed when the area is displayed as a user interface screen, an "upload area" that is an area where, when the area is displayed as a user interface screen, data upload to the area is possible, and a "fixed information area" where download and upload of data cannot be performed and predetermined information (e.g., index information such as "first floor" and "second floor") is fixedly displayed. As an example, operation for selecting any one of the three types of areas is enabled by pull-down menus shown in FIGS. 11 and 12.

The processor 101 of the server 100 causes the HDD 104 of the server 100 to store, in association with a login ID of the screen creator and identification information of an organization such as a store associated with the login ID, information concerning the design template selected and subjected to the various settings as the layout data.

In this way, when a user interface screen viewed by an unspecified large number of guests is created, a design template appropriately extracted from a plurality of template groups serving as samples on the basis of information concerning a guest is provided to the screen creator. Consequently, it is possible to easily perform creation of a user interface screen more conforming to attributes of the guest set as a target.

If an age bracket, sex, and the like of a guest who operates a signage apparatus set in a certain store are narrowed to a certain degree, it is desirable to use a design template appropriate for attributes of the guest.

Therefore, a creator of a user interface screen and a store operator are enabled to optionally set information concerning guests in a target class using the processor 801 (the guest-information setting unit). Consequently, it is possible to present, to the screen creator, as candidate templates, design templates that enable more effective information provision to the target guest.

Information concerning language setting of a guest owned terminal communicably connected to the signage apparatus 200 is acquired by the processor included in the signage apparatus 200 or the processor 101 (a language-setting-information acquiring unit) included in the server 100. Consequently, the processor (a display control unit) can cause, with language setting indicated by information concerning the language setting acquired by the processor (the language-setting-information acquiring unit), the signage apparatus 200 to display a user interface screen in the signage apparatus 200.

In this case, if there is a guest owned terminal that communicates with a signage apparatus, language setting of a user interface screen in the signage apparatus is adjusted to language setting of the guest owned terminal. Consequently, it is possible to display the user interface screen in a language easily understood by a guest present near the signage apparatus.

Note that, in the embodiment explained above, a relationship between attributes of the guest set as the advertisement target and a design template associated with the attributes is specified beforehand mainly on the screen creator side. However, not only this, but, for example, on the basis of statistical information indicating what kinds of design templates guests having respective attributes actually operated in the past, a design template frequently operated by a guest having certain attributes may be actively recommended to a screen creator who performs advertisements targeting the guests having the attributes.

In the explanation in this embodiment, the functions for carrying out the invention are recorded in advance in the apparatus. However, not only this, but the same functions may be downloaded from a network to the apparatus or a recording medium having the same functions stored therein may be installed in the apparatus. A form of the recording medium may be any form as long as the recording medium is a recording medium that can store a computer program and readable by the apparatus such as a CD-ROM. The functions obtained by the installation or the download in advance may be realized in cooperation with an OS (operating system) in the apparatus.

The present invention can be carried out in other various forms without departing from the spirit or the main features of the present invention. Therefore, the embodiment is only an illustration in every aspect and should not be limitedly interpreted. The scope of the present invention is indicated by claims and is not restricted by the text of the specification at all. Further, all modifications and various improvements, substitutions, and alterations belonging to the scope of equivalents of the claims are within the scope of the present invention.

What is claimed is:

1. A user interface screen creation supporting system comprising:
    a signage apparatus configured to be set in a place where a plurality of guests visit, and to display a user interface screen operable by a guest of the plurality of guests, and to capture an image of the guest;
    a terminal configured to be operated by the guest, and to display a design template for supporting creation of the user interface screen by using a web browser; and
    a server configured to acquire the image of the guest from the signage apparatus and
        to select, on the basis of the image of the guest, out of a plurality of template groups stored in a predetermined storage region in advance, a design template
        and to provide the design template selected to the terminal, and to provide the user interface screen edited by using the design template, wherein
    the design template comprises contents areas that are different in the array position or the number of the contents areas per the design template, and a representative image and a detailed data can be set in a contents area of the contents areas, and
    the signage apparatus displays the representative image on the contents area and a cursor indicating the representative image selected by a user by using the terminal, and
    the terminal accepts the selection of the representative image and displays the detailed data corresponding to the representative image selected.

2. The system according to claim 1, wherein
    the server decides a sex and an age of the guest based on the image of the guest, and selects the design template based on the sex and the age of the guest.

3. The system according to claim 1, wherein
    the signage apparatus:
        acquires information concerning language setting of the terminal communicably connected to the signage apparatus and
        displays the user interface screen with the language setting indicated by the language setting.

* * * * *